(12) United States Patent
Lochtefeld

(10) Patent No.: US 8,641,543 B2
(45) Date of Patent: Feb. 4, 2014

(54) METHOD AND APPARATUS FOR STORING AND TRANSPORTING PORTABLE STATIONARY SHEET FLOW WATER RIDES

(76) Inventor: Thomas J. Lochtefeld, La Jolla, CA (US)

(*) Notice: Subject to any disclaimer, the term of this patent is extended or adjusted under 35 U.S.C. 154(b) by 132 days.

(21) Appl. No.: 13/149,471

(22) Filed: May 31, 2011

(65) Prior Publication Data
US 2011/0237337 A1 Sep. 29, 2011

Related U.S. Application Data

(63) Continuation of application No. 12/291,734, filed on Nov. 13, 2008, now Pat. No. 7,951,011.

(60) Provisional application No. 61/002,888, filed on Nov. 13, 2007, provisional application No. 61/131,137, filed on Jun. 6, 2008.

(51) Int. Cl.
A63G 21/18 (2006.01)
A63G 31/00 (2006.01)

(52) U.S. Cl.
USPC .............................. 472/117; 472/3; 472/128

(58) Field of Classification Search
USPC .......... 472/3, 29, 116–117, 128, 129; 104/69, 104/70
See application file for complete search history.

(56) References Cited

U.S. PATENT DOCUMENTS

| | | | |
|---|---|---|---|
| 4,903,959 A | 2/1990 | Barber | |
| 5,061,211 A | 10/1991 | Barber | |
| 5,314,383 A * | 5/1994 | Fabbri | ............................. 472/45 |
| 5,676,601 A | 10/1997 | Saunders | |
| 6,491,589 B1 | 12/2002 | Lochtefeld | |
| 6,676,530 B2 | 1/2004 | Lochtefeld | |

* cited by examiner

Primary Examiner — Kien Nguyen
(74) Attorney, Agent, or Firm — J. John Shimazaki

(57) ABSTRACT

The invention relates to a portable water ride having a trailer with a water catch basin built therein, wherein at least two pivoting supports are provided which can be deployed to an expanded position and stowed to a vertical position. When the supports are deployed, a flexible ride surface can be stretched between said supports to form an inclined ride surface upon which a sheet flow of water from a nozzle housing can be provided upon which water skimming maneuvers can be performed. A walkway on either side of the ride surface, as well as an entrance platform at the top of the ride surface, and other grated platforms, railings, etc., can also be provided.

20 Claims, 13 Drawing Sheets

FIG. 5
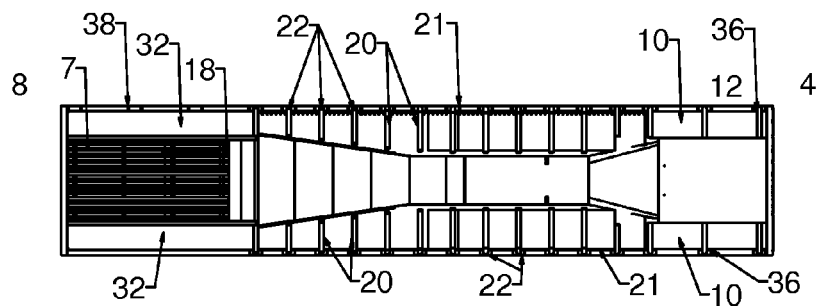
FIG. 6
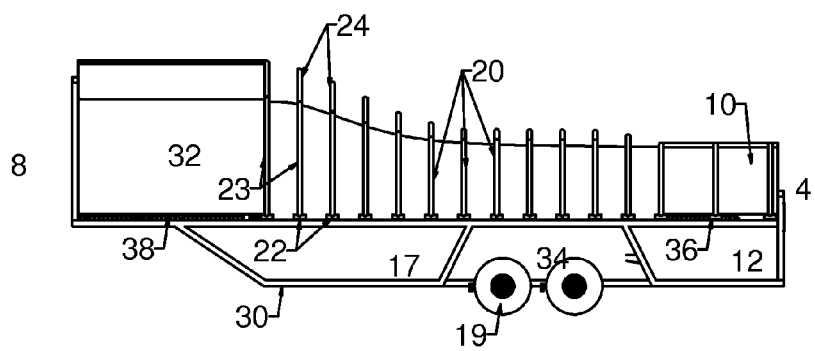
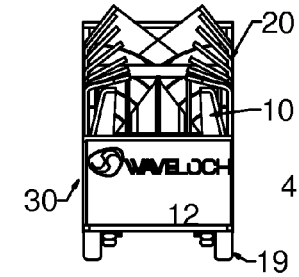
FIG. 8
FIG. 7
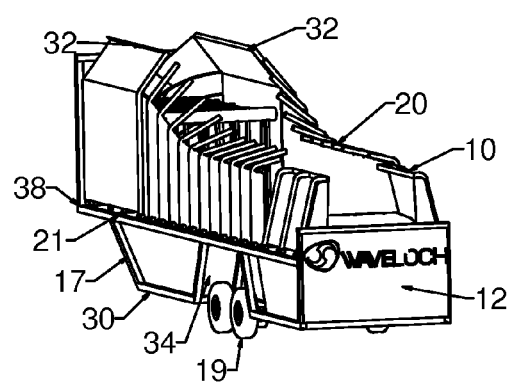

WHEELS SHOWN IN EXPANDED POSITION

TRAILER CLAMP FOR CONTINUOUS CLOSURE VINYL FABRIC

ISOMETRIC VIEW OF A SECTION OF THE SIDEWALL
VINYL CLOSURE SYSTEM IN THE OPEN POSITION

SECTION VIEW OF SIDEWALL VINYL

BOLT

SIDEWALL 2X4

MAIN TRAILER FRAME MOUNTING TABS

HINGE DETAIL
BOLTED CONNECTIONS FOR THE
HINGE USES A BUSHING BETWEEN
THE BOLT AND SIDEWALL 2X4
TYPICAL FOR ALL LOCATIONS

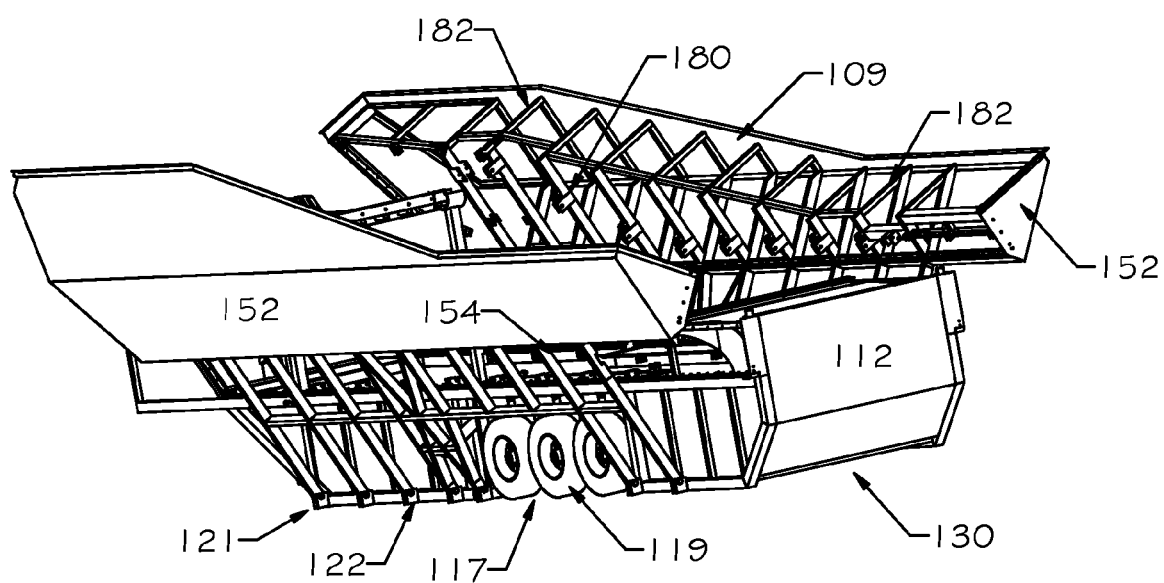
FIG. 24  SIDE WALLS HALF OPEN

METHOD AND APPARATUS FOR STORING AND TRANSPORTING PORTABLE STATIONARY SHEET FLOW WATER RIDES

RELATED APPLICATION

This is a continuation application of U.S. patent application Ser. No. 12/291,734, filed on Nov. 13, 2008 now U.S. Pat. No. 7,951,011, and claims priority from U.S. Provisional Application Ser. Nos. 61/002,888, filed Nov. 13, 2007, and 61/131,137, filed Jun. 6, 2008, all of which are incorporated herein by reference.

FIELD OF THE INVENTION

The present invention relates to the field of simulated surfing apparatuses and methods, and in particular, to a method and apparatus for storing and transporting portable stationary sheet flow water rides having a contoured or inclined ride surface, wherein by configuring the apparatus appropriately, the water ride can be made to be compact so that it can be fitted and stored in a standard shipping container.

BACKGROUND OF THE INVENTION

Sheet flow water rides have become popular in recent years. The technology that Applicant has previously developed termed FlowRider® relates to a standing wave sheet flow water ride attraction adapted to inject a sheet flow of water under pressure onto a contoured or inclined ride surface. By injecting water under pressure in this manner, i.e., at supercritical speed, the sheet flow is supported underneath by the ride surface and conforms without breaking to the contours thereof. This allows a rider to perform water skimming and simulated surfing maneuvers on the ride surface and sheet flow by using the force of gravity and the upward momentum created by the upward flow, wherein the rider can oscillate back and forth in substantial equilibrium while performing maneuvers thereon.

Typically, these sheet flow water rides are considerably smaller and have a smaller footprint than traditional water rides, such as wave pools, water slides and log rides, etc., and therefore, are less expensive to manufacture, construct and install than conventional water rides. Nevertheless, one of the drawbacks of these water rides is that there is the potential for reduced throughput and therefore reduced capacity. For example, in many cases, especially when smaller versions of the water ride are installed, only a single rider may be able to ride the water ride at any given time. Moreover, due to the nature of the ride, it is often desirable for riders to spend a longer period of time, i.e., more than just a few seconds, riding on the water ride so that they can learn the skills necessary to ride it properly. Riders will also need to ride it multiple times to achieve the skill sets necessary to perform adequately.

Nevertheless, one of the main advantages of these water rides is that in addition to being a participatory sport, they are also a great spectator sport, i.e., they have the ability to attract spectators who may be interested in watching the participants, even if they don't have a desire to ride the ride themselves. In this respect, in addition to traditional water theme parks and amusement parks, these water rides have been popular and installed at restaurants, night clubs, bars, at the beach, at private resorts, etc., and/or provided with loud speakers and colorful lights so that competitions and demonstrations can be held that customers would be willing to pay to watch. They have also been installed at sporting goods stores and other businesses as a means of attracting customers to their stores.

These water rides can also be used in connection with promotional and/or sponsorship activities by businesses that may be interested in using the water ride as a means of promoting the products and/or services that they sell. For example, third party businesses may have an interest in using the water ride at a planned promotional event or activity with surfing as a theme, and in such case, they might want to have the water ride available at a remote location which could help promote their products and/or services or other objective at that venue.

The ride surface itself also provides an excellent platform for the placement of advertisements, banners and logos, etc., which can be the focal point of not only spectators, but also photographers and specific targeted marketing materials and brochures. For this reason, business may have an incentive to use the water ride in a variety of promotional applications outside the normal water theme park and amusement park context. Even though throughput may be relatively low, many businesses may have an interest in using these water rides as a means of attracting customers to their businesses, and/or promoting their products and/or services.

For these reasons, it has been found that in some cases it is desirable to have a portable version of the water ride available, so that it can be transported to and set up at remote locations where special events and/or activities might be held or planned, rather than having them permanently installed in the ground at a theme park or amusement park. Indeed, by making them portable, these water rides can potentially be used much like a moon bounce at a children's party, or a band at a wedding, etc., i.e., they can be the means by which third party businesses can provide entertainment for their guests, including customers, employees and others they may invite to an activity or event. Although the sheet flow water ride concept may be more suited for younger adults, it has the potential for mass appeal to the general public at large, i.e., surfing is a popular iconic sport that has significant appeal to people of all ages throughout the world.

In the past, as shown in Applicant's U.S. Pat. No. 6,491,589, attempts have been made to modularize these sheet flow water rides and their components so that they can be disassembled, stored, transported, and then re-assembled when necessary, and used at a remote site. Various components of the water ride, including the ride surface itself, were modularized, and had to be broken down into several pieces, and then assembled and disassembled, which disadvantageously increased the time it took to set it up, wherein more manpower was required. This not only increased the need to hire more laborers, but it also increased the time it took to set it up. The modularization of the components also allowed seams to be formed which could potentially result in leaks on the ride surface.

In Applicant's U.S. Pat. Nos. 6,676,530 and 7,367,894, water rides were shown comprising a reinforced membrane material tensioned over a supporting framework which allowed the water ride to be relatively light and capable of being manufactured and installed without expensive molded composite fiberglass and concrete ride surfaces. Nevertheless, the specific design of these water rides was not shown or intended to be portable.

What is needed therefore is a portable sheet flow water ride that can be stored and transported easily without having to assemble and disassemble separate pieces for each set up, which can utilize integrated ride surface components to avoid creating seams that could potentially lead to leaks, and which can be made compact so that it can be built on a trailer and stored and fitted into a standard shipping container.

SUMMARY OF THE INVENTION

Unlike previous attempts to modularize the Applicant's sheet flow water ride invention, the present invention relates to a method and apparatus that attempts to configure the water ride, including its ride surface, so that it can be stored and transported with greater ease, and assembled and disassembled with greater efficiency and reduced time, while being compact enough when stowed so that it can fit onto a trailer and be stored and fitted into a standard shipping container. In particular, the water ride of the present invention is preferably made so that it folds and unfolds, and transforms easily, wherein when it is stowed, it is preferably capable of being arranged on a single trailer and stored in a single shipping container, and when it is deployed, it preferably comprises a fully functioning and operational sheet flow water ride similar to those that are land locked and permanently installed at theme parks and the like. And, unlike previous modularized versions, which had multiple components with seams on the ride surface that could potentially leak, the components that are used in Applicant's current invention are integrated and formed with unitary members so as to avoid the possibility of leaks altogether.

The water ride of the present invention is preferably configured and built onto an elongated transport vehicle or trailer with wheels shaped much like a standard trailer. The main central housing of the vehicle essentially forms a water catch basin for storing the water needed to operate the water ride, including a forward portion for housing the injection nozzles and pump, and a rearward portion on which is located the ride entrance platform. The components above the housing and extending between the nozzles and entrance platform are preferably adapted to form the ride surface which is preferably formed using a unitary reinforced membrane which folds and unfolds between stowed and deployed positions. Preferably, there are two deployable walkways extended on either side of the ride surface which can be attachable or made detachable.

In its deployed position, the water ride of the present invention preferably comprises a flexible inclined ride surface upon which a sheet flow of water can be propelled much like other water rides of this type. The ride surface is preferably longitudinally extended and made from a single unitary stretched fabric or membrane material, such as those described in Applicant's U.S. Pat. No. 6,676,530. As in the case of that invention, the membrane is preferably suspended and pulled tight over a supporting framework along its longitudinal edges.

In the first embodiment, the fabric edges are preferably secured to multiple support bars or posts that extend laterally from the central housing along either side of the ride surface. These support bars are preferably adapted so that when they are deployed they are extended outward laterally, forming cantilevered support posts that progressively extend higher from front to back. Preferably, they form a series of connecting points that extend along an incline, which form the basis for the slope of the ride surface. When the fabric is removed (or folded), and the water ride is stowed, the support bars are preferably swung up and folded along their hinges into a compact substantially vertical position.

In the second embodiment, rather than having multiple support bars or posts that extend laterally outward from the central housing along either side of the ride surface, two integrated members can be provided that accomplishes substantially the same objective. That is, rather than using individual support bars that are hinged and swing out to support the fabric, in this embodiment, preferably an integrated section can be swung out and expanded to provide support for the fabric on either side, wherein the integrated members can be deployed and expanded so that they can extend outward laterally, forming cantilevered sections with a top surface that progressively extends higher from front to back. Preferably, the integrated sections have a series of connecting points that extend along the incline, which form the basis for connecting the ride surface thereto, i.e., along the slope of the ride surface. In this embodiment, when the integrated sections are swung up and stowed away, the fabric can remain in place and simply be folded up as a single piece rather than having to remove the fabric each time the water ride is stowed away. When the water ride is ready to be stowed, the integrated sections on either side are preferably swung up and folded along their hinges, into a compact substantially vertical position, above the trailer.

In both embodiments, the injection nozzles are preferably located in the front housing and are preferably extended above the stretched fabric such that they can inject water under pressure onto the ride surface. The internal components of the front compartment preferably comprise not only the nozzles and pump, but an inlet for drawing water from the catch basin and injecting it onto the ride surface. On either side of the front housing, there is preferably a pivoting extension platform with grates that can provide additional standing room for participants in and around the front of the ride.

In the first embodiment, the walkways are preferably capable of being mounted to the support bars on either side of the ride surface, thereby forming inclined paths with railing thereon upon which participants can walk. The walkways preferably extend laterally outward from the ride surface, and extend longitudinally up from the front housing to the back entrance platform to allow participants to walk up the sides. Because the walkways are extended laterally outward, adjacent to the ride surface, they also provide areas for viewing, as well as additional egress means so that participants can easily exit from the water ride if desired.

In the second embodiment, the walkways also have railings but the walkways themselves are preferably formed as part of the integrated sections. They are preferably hinged and mounted to the catch basin on either side, such that when the integrated sections are deployed, the walkway sections are also automatically deployed, thereby forming inclined paths upon which participants can walk. The walkways are preferably compact enough so they can be swung up and stowed in a vertical position above the trailer and fitted within a standard shipping container. As in the first embodiment, the walkways are preferably extended longitudinally from the front to the back to allow participants to walk up. And because the walkways are preferably extended adjacent to the ride surface, they also provide areas for viewing, as well as additional egress means for participants on the ride surface if desired.

The back entrance platform is preferably extended above the ride surface so that it provides a standing area for participants to enter onto the ride surface, i.e., from there they can maneuver onto the ride surface and against the oncoming sheet flow of water. The entrance platform preferably has a grated floor through which water can pass. This way, as the water flows up and over the incline of the ride surface it can flow through the grated floor, and down into the catch basin underneath. From there, water can be collected in the catch basin and circulated back toward the front housing where the pump and nozzles are located. The entrance platform preferably comprises two pivoting extensions that can provide additional standing room for the participants. Like the other components, the platforms are preferably able to be pivoted upward and stowed in a substantially vertical position. The entrance platform is also extended outward so that it can be connected to the walkways on either side.

The wheels on the trailer are preferably housed within a recess so that they do not interfere with the placement of the trailer in a standard shipping container. The wheels are preferably retractable so that when the water ride is deployed, they allow the trailer to lay flat on the ground. When the water ride is stowed, the wheels are preferably extended out so that the trailer can be easily pulled.

In the first embodiment, the multiple support bars, as well as the two front extension platforms, and the two back extensions on the entrance platform, are preferably swung up and folded so that they are relatively compact and extended in a substantially vertical position. These members are preferably configured so that when they are stowed, the trailer can be fitted within a standard shipping container.

In the second embodiment, the two integrated sections that comprise the walkways, as well as the two front extension platforms, and the two back extensions on the entrance platform, are preferably swung up and folded so that they are relatively compact and extended in a substantially vertical position. These components are preferably combined within the integrated sections and configured so that when they are stowed, the trailer can be fitted within a standard shipping container.

Exemplary features of the present invention are shown. Nevertheless, it should be clear that not all of the features discussed are essential for the present invention to operate and function properly and effectively. In this respect, two similar embodiments are shown having somewhat different components and features. Substitutions for these and other components are contemplated without departing from the scope of the invention.

BRIEF DESCRIPTION OF THE INVENTION

FIG. 5 is a plan view of the first embodiment of the portable sheet flow water ride attraction of the present invention in its stowed position;

FIG. 6 is a side view of the sheet flow water ride attraction shown in FIG. 5 in its stowed position;

FIG. 7 is an isometric view of the sheet flow water ride attraction shown in FIG. 5 in its stowed position;

FIG. 8 is an end view of the sheet flow water ride attraction of FIG. 5 in its stowed position;

FIG. 23b shows a detail of the hinge of the second embodiment of the sheet flow water ride attraction of the present invention circled in FIG. 23a; and FIG. 24 is an isometric view of the second embodiment of the sheet flow water ride attraction of the present invention showing the arrangement of the integrated sections with the water ride in a half deployed position.

DETAILED DESCRIPTION OF THE INVENTION

1. First Embodiment

Figure 1:
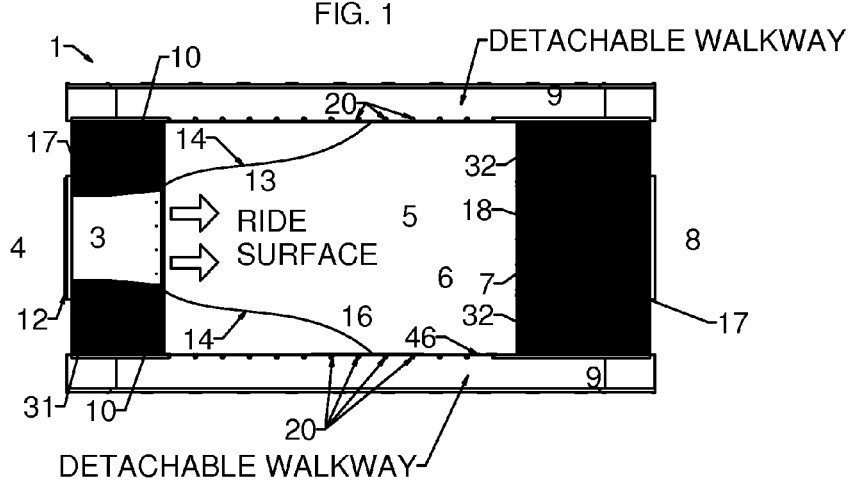
FIG. 1 is a plan view of a first embodiment of the portable sheet flow water ride attraction of the present invention in its fully deployed position.

FIG. 1 shows an overhead view of an embodiment of the portable sheet flow water ride attraction of the present invention 1 in the deployed position, preferably having water injection nozzles 3 on one end 4, a stretched fabric ride surface 5 having an incline 6, an elevated grated entrance platform 7 on the opposite end 8, and detachable walkways 9 extending longitudinally on either side. Additional grated sections 10 are preferably extended on either side of nozzle housing 12 for additional standing room, and additional grated sections 32 are preferably extended on either side of entrance platform 7 that connect to walkways 9. Arrows 13 show the direction of the flow of water on ride surface 5, and lines 14 simply show an approximate edge of the sheet flow of water on ride surface 5 while the water ride is operating. Railings 15 are preferably provided on the sides of walkways 9.

Figure 2:
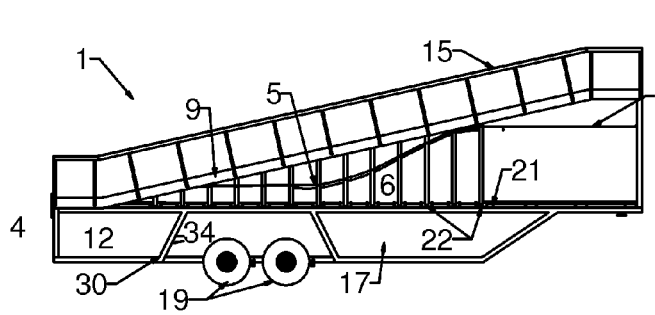
FIG. 2 is a side view of the sheet flow water ride attraction shown in FIG. 1 in its fully deployed position.
Figure 9:
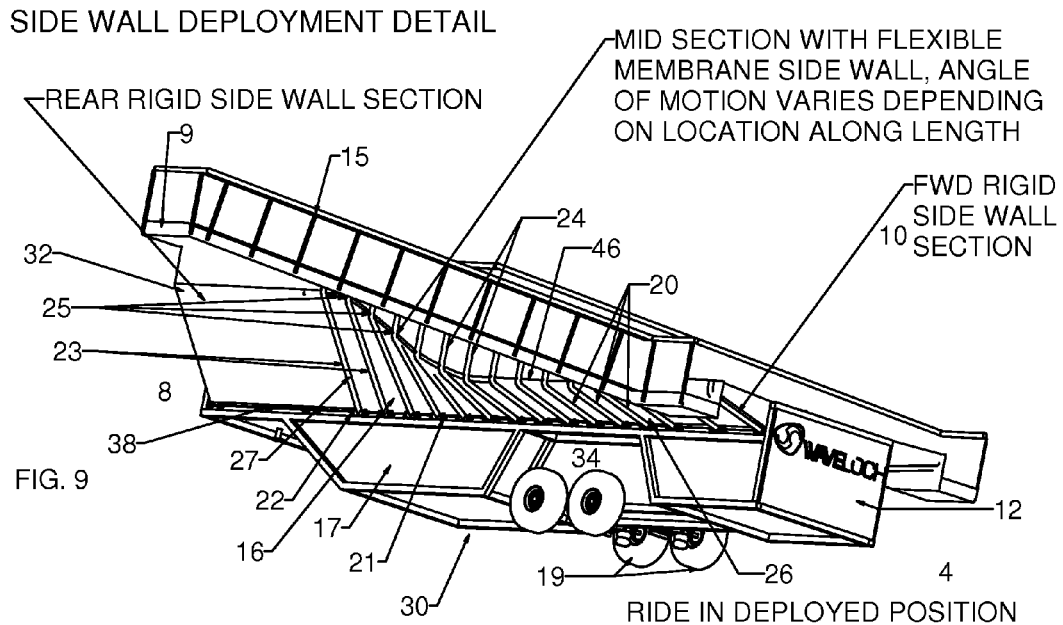
FIG. 9 is an isometric view of the first embodiment of the sheet flow water ride attraction of the present invention showing the multiple support bars with the water ride in its fully deployed position.

As can be seen in FIG. 2, ride surface 5 is generally sloped at an angle with an incline 6 that extends upward from nozzle end 4 to elevated entrance platform 7 on end 8. Ride surface 5 is preferably made of a single unitary stretched fabric or membrane 16 that is secured longitudinally along its edges 46 by multiple bars 20, as shown in FIGS. 1 and 9. Because fabric 16 forms ride surface 5, and is stretched and suspended between multiple bars 20, the location of connectors 25 on multiple bars 20 can dictate the shape and incline of ride surface 5. The tensioning of fabric 16 dictates how flexible or stiff ride surface 5 will be.

FIG. 9 shows bars 20 extended out and up in their deployed positions about hinge line 21. Each bar 20 preferably has a lower hinge 22, a lower segment 23, and an upper segment 24 bent in relation to lower segment 23, as well as a fabric connector 25, which are preferably located at the bend between lower and upper segments 23, 24. When bars 20 are deployed about their hinges 22, lower segments 23 are preferably progressively angled, as shown in FIG. 9, from front end 4 to back end 8, whereas, upper segments 24, on the other hand, are preferably adapted so that they extend substantially vertically in their deployed positions.

It can be seen that lower segments 23 vary in length and angle relative to hinges 22 to account for the slope of ride surface 5. For example, when bars 20 are fully deployed, the first bar 26 closest to nozzle end 4 extends out about 10 degrees relative to horizontal, whereas, the last bar 27, furthest from nozzle end 4, extends out about 45 to 60 degrees relative to horizontal. In this manner, fabric connectors 25 on bars 20 form a series of fastening points that extend upward along a slope, such that ride surface 5, which is attached to fabric connectors 25, follows along the same slope.

In the center and extending longitudinally is preferably a unitary construction water catch basin 17 extending below ride surface 5, which preferably extends from front end 4 to back end 8, and from nozzle housing 12 to elevated entrance platform 7. That way, as water is propelled onto ride surface 5, such as by nozzles 3, in the direction of arrows 13, water can flow up and over incline 6, and pass through grates 18, on elevated entrance platform 7, and then down into catch basin 17. As water collects in basin 17, water can be stored and then drawn by a pump (not shown) inside nozzle housing 12, where nozzles 3 are located.

The outer perimeter shape of basin 17 can be seen in FIG. 1 extending below grates 18 on entrance platform 7, and below grates 31 on extended sections 10. The basin itself, by being unitary in construction and structure, preferably prevents water from leaking out. Nevertheless, a waterproof membrane can be provided over basin 17 so that it can avoid further leaks. The membrane can be extended further up along lower segments 23 of bars 20 to enable more water to be stored.

Water catch basin 17 is preferably formed as part of a trailer-like vehicle 30 upon which water ride 1 is situated, and is preferably configured and dimensioned to fit within a standard shipping container. Trailer 30 preferably has wheels 19 that are retractable. When wheels 19 are retracted, trailer 30 can rest on the ground. When wheels 19 are extended, trailer 30 can be easily rolled and pulled with a trailer hitch. Wheels 19 are preferably housed within a recessed section 34 of trailer 30.

Figure 4:
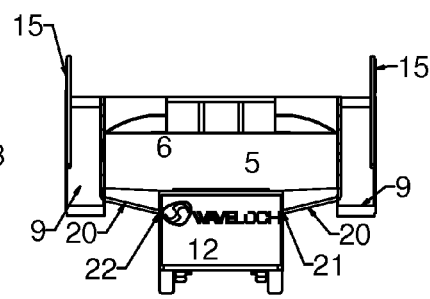
FIG. 4 is an end view of the sheet flow water ride attraction of FIG. 1 in its fully deployed position.
Figure 3:
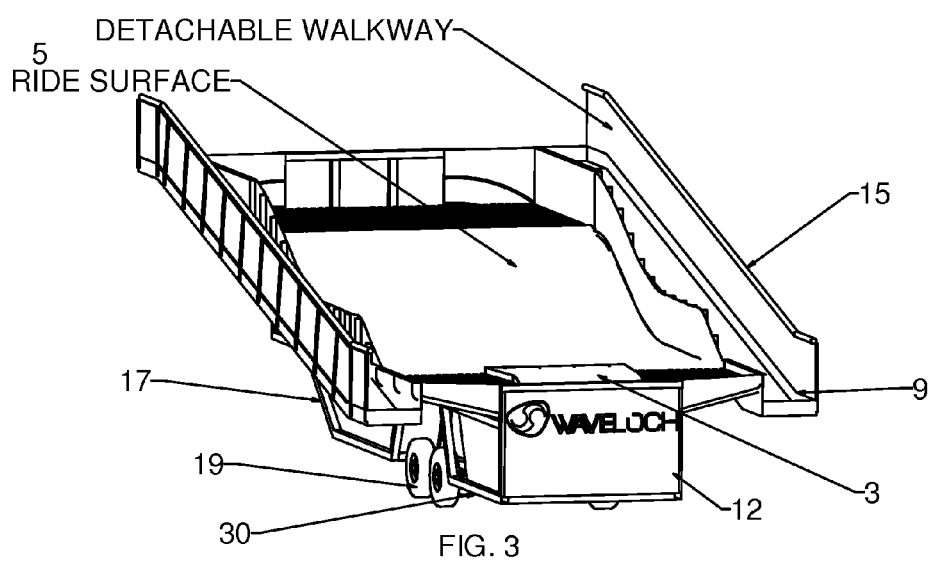
FIG. 3 is an isometric view of the sheet flow water ride attraction shown in FIG. 1 in its fully deployed position.

Two detachable walkways 9 with railings 15 are preferably adapted to be connected to bars 20 and cantilevered outward from trailer 19 as shown in FIG. 4. When deployed, walkways 9 preferably extend along an incline as shown in FIG. 2, which allows participants to walk up the walkway toward entrance platform 7. Walkways 9 are preferably extended adjacent to ride surface 5 longitudinally on either side, such that they function as a viewing area, as well as exit platforms on which participants can easily egress from ride surface 5.

Figure 10:
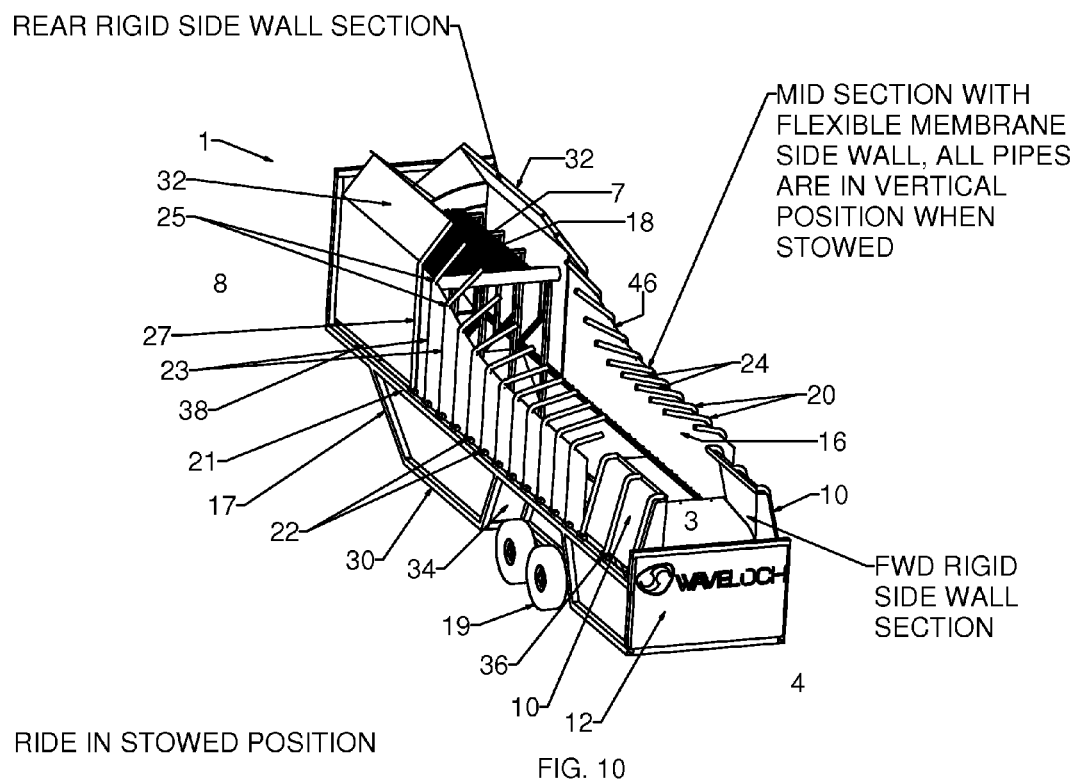
FIG. 10 is an isometric view of the first embodiment of the sheet flow water ride attraction of the present invention showing the multiple support bars with the water ride in its stowed position.

FIGS. 5-8 and 10 show water ride 1 in its stowed position. For proper stowing, walkways 9 are preferably removed and disassembled, and stored. Extended front platform sections 10 are preferably swung up above nozzle housing 12 along a hinge 36 into a substantially vertical position. Back extensions 32 of entrance platform 7 are preferably swung up along a hinge 38 into a substantially vertical position. Bars 20 are preferably swung up on hinges 22 along hinge line 21 into a substantially vertical position—with lower segments 23 extending vertically. Wheels 19 are preferably extended out of recessed section 34. Fabric 16 can be removed from bars 20 and folded, or, in some cases, fabric 16 can be left on and folded up and stowed away. By making these adjustments, as can be seen in FIGS. 7, 8 and 10, the entire water ride 1 is compact and preferably suitable for storage in a standard shipping container.

Then, to deploy and set up water ride 1, the reverse steps can be followed. For example, wheels 19 can preferably be extended up into recessed section 34. Bars 20 are preferably swung down on hinges 22 along hinge line 21 into a substantially extended lateral position—with lower segments 23 extending at various angles and upper segments 24 extending vertically. Fabric 16 can then be attached to connectors 25 on bars 20 and spread out and pulled tight to form ride surface 5. Extended front platform sections 10 are then preferably swung down along a hinge 36 into a substantially horizontal position and back extensions 32 of entrance platform 7 are preferably swung down along hinge 38 into a substantially horizontal position. Walkways 9 can then be reattached and set up. None of these steps are necessarily done in the order listed.

Most of the structural components of the present invention including without limitation basin 17, bars 20, housing 12, entrance platform 18, walkways 9, railings 15, grated section 10 and extensions 32, can be made with stainless steel or other durable and strong corrosion resistant material. Fabric 16 can be made using a suitable durable fabric or membrane material such as a reinforced polyester membrane coated on at least one side with a fluorinated polymer material such as rubber, polyurethane, latex, Teflon, fluorinated polymers, and/or PVDF. The fabric can comprise of fibers or yarns such as carbon fiber, Kevlar®, rayon, nylon, polyester, PVC, and/or PVDF. The other areas of the water ride surrounding ride surface 5 are preferably covered with a waterproof padding consisting of foam with a water-impervious later or coating on top.

2. Second Embodiment

Figure 11:
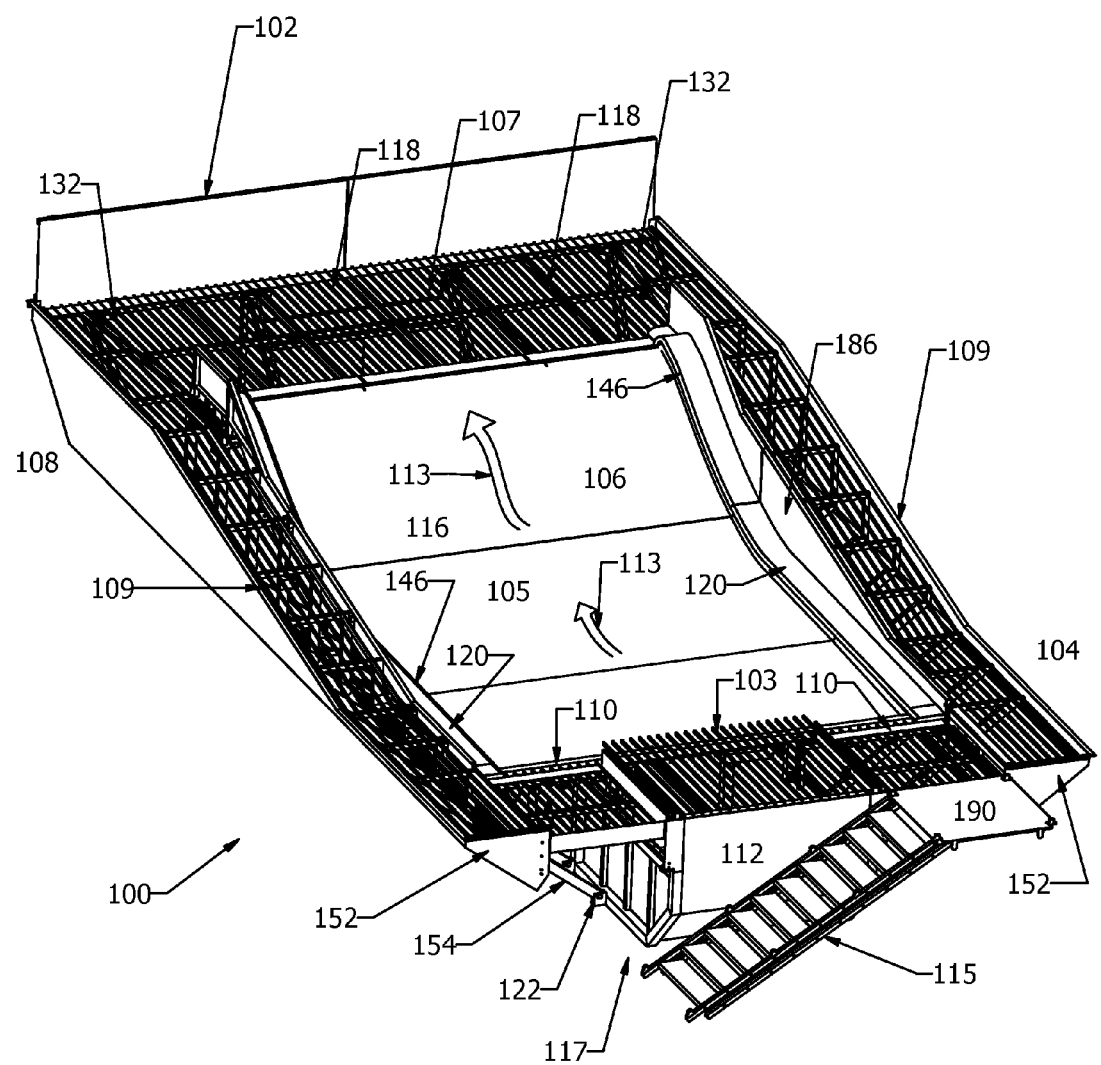
FIG. 11 is an isometric view of a second embodiment of the portable sheet flow water ride attraction of the present invention in its fully deployed position.

FIG. 11 shows an overhead isometric view of a second embodiment of the portable sheet flow water ride attraction of the present invention 100 in its deployed position, preferably having water injection nozzles 103 in a grate covered housing 112 on one end 104, a stretched or tensioned fabric 116 forming a ride surface 105 having an incline 106, an elevated grated entrance platform 107 on the opposite end 108, and inclined walkways 109 extending longitudinally on either side, preferably grated. Additional grated extension sections 110 are preferably extended on either side of nozzle housing 112 to provide additional standing room for the participants, and additional grated extension sections 132 are preferably extended on either side of entrance platform 107. Preferably, these sections 110 and 132 are connected to walkways 109 to form a continuous area for the participants to walk on. Railings (not shown in these figures) are preferably connected to posts 184 provided around the outer perimeter of walkways 109 and other areas where necessary to prevent participants from falling. A detachable back wall 102 or railing is preferably provided along opposite end 108. A stairway 115 with a ramp 190 is preferably provided in front of housing 112 along end 104. Arrows 113 show the direction of the flow of water on ride surface 105.

Figure 11A:
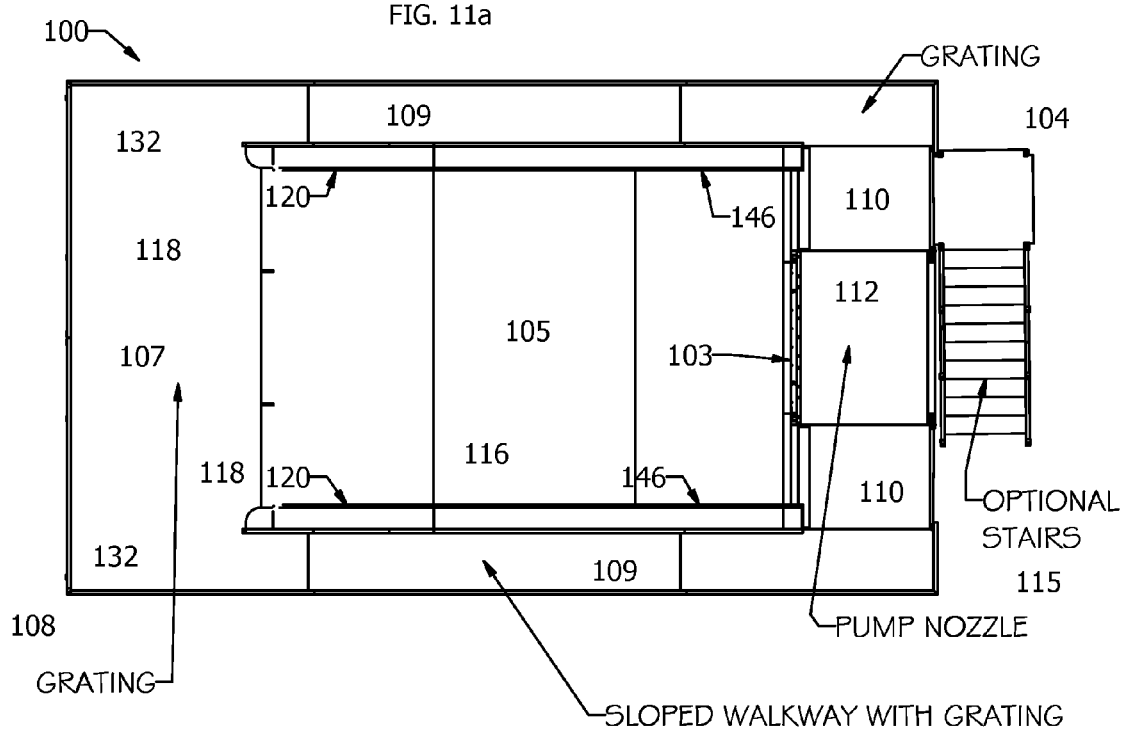
FIG. 11a is a plan view of the sheet flow water ride attraction shown in FIG. 11 in its fully deployed position.
Figure 12:
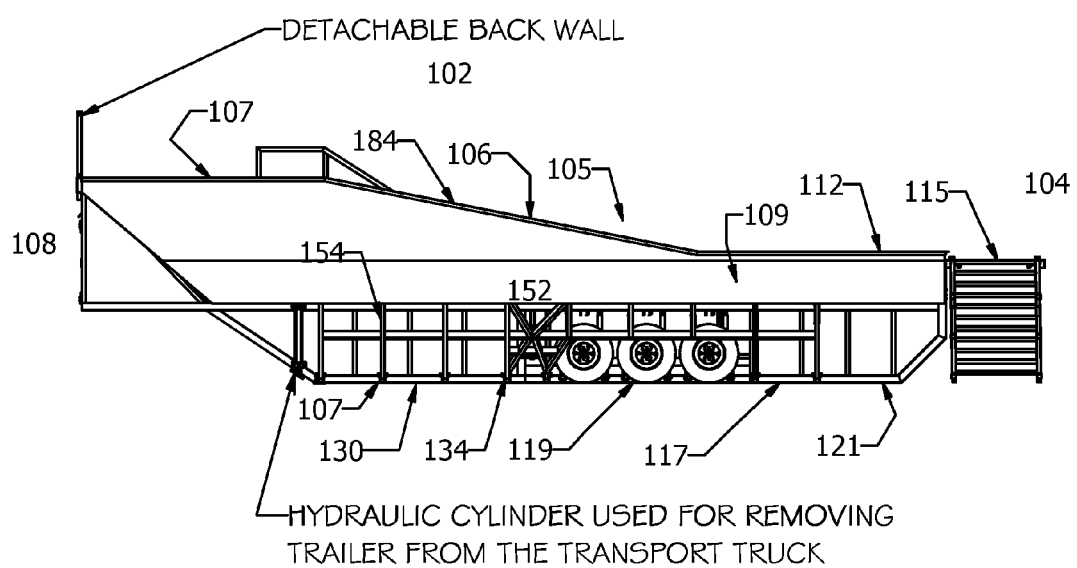
FIG. 12 is a side view of the sheet flow water ride attraction shown in FIG. 11 in its fully deployed position.
Figure 14:
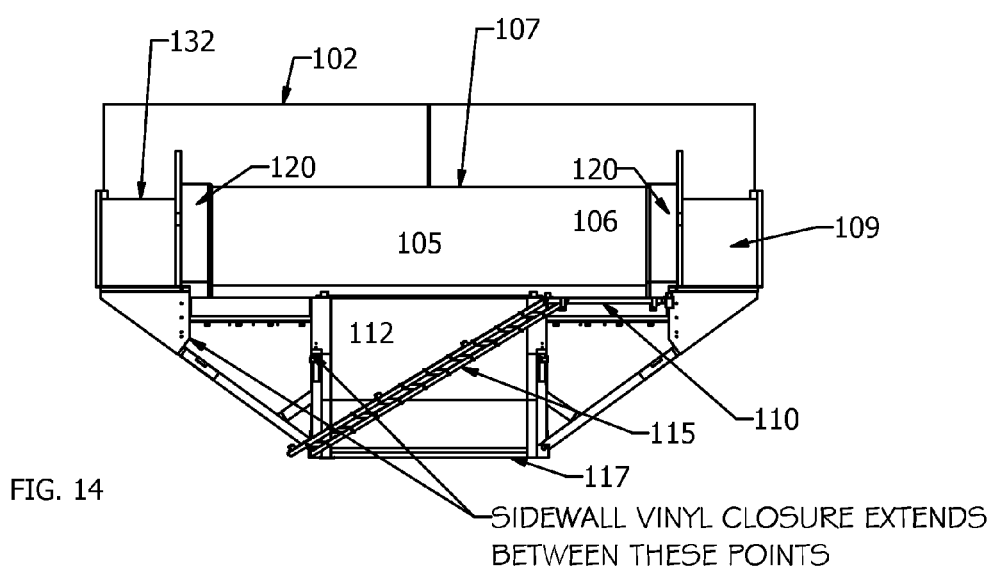
FIG. 14 is an end view of the sheet flow water ride attraction of FIG. 11 in its fully deployed position.
Figure 15:
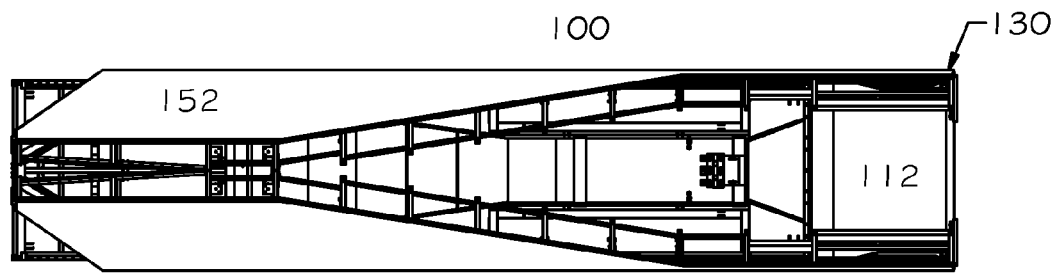
FIG. 15 is a plan view of the second embodiment of the portable sheet flow water ride attraction of the present invention in its stowed position.
Figure 16:
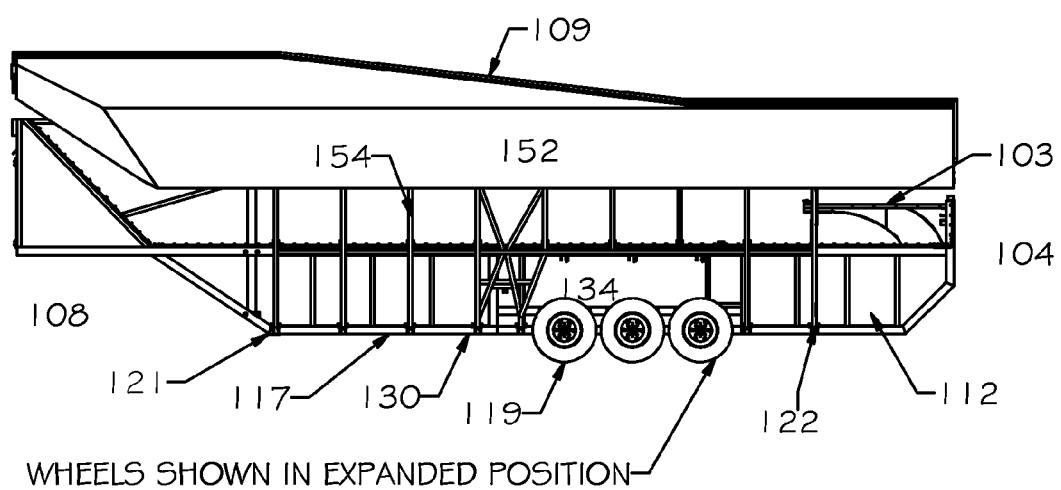
FIG. 16 is a side view of the sheet flow water ride attraction shown in FIG. 15 in its stowed position.

Extending longitudinally in the center and under ride surface 105 is preferably a water catch basin 117, as shown in FIGS. 12 and 14, which preferably has no joints or seams and extends from front end 104 to back end 108, i.e., from nozzle housing 112 to elevated entrance platform 107. Basin 117 is preferably similar to basin 17 and provides a means for collecting and storing the water injected onto ride surface 5 and circulated through back end 108. That is, as water is propelled onto ride surface 105 by nozzles 103 in the direction of arrows 113, water can flow up and over incline 106, and pass through grates 118 on elevated entrance platform 107, and then into catch basin 117 where the water is collected and stored. And, as water collects in basin 117, water can be drawn by pump (not shown) inside nozzle housing 112, wherein nozzles 103, as shown in FIG. 16, can be used to inject a sheet flow of water onto ride surface 105 at the desired flow rate and volume to produce a sheet flow of water upon which riding, surfing and skimming maneuvers can be performed. The outline of basin 117 can be seen in plan view in FIG. 11a (as a dashed line) extending below ride surface 105 and entrance platform 107.

Basin 117 is preferably formed as a single unitary structure so that there are no joints or seams that could allow water to leak out. Water catch basin 117 is preferably formed as part of a trailer-like vehicle 130 upon which water ride 100 is situated, as shown in FIG. 12, and is preferably configured and dimensioned to be fitted within a standard shipping container. Trailer 130 preferably has wheels 119 that are retractable as shown in FIG. 12. When wheels 119 are retracted, trailer 130 can rest on the ground, and when wheels 119 are extended, trailer 130 can be easily rolled and pulled with a trailer hitch. Wheels 119 are preferably housed within a recessed section 134 of trailer 130.

Figure 17:
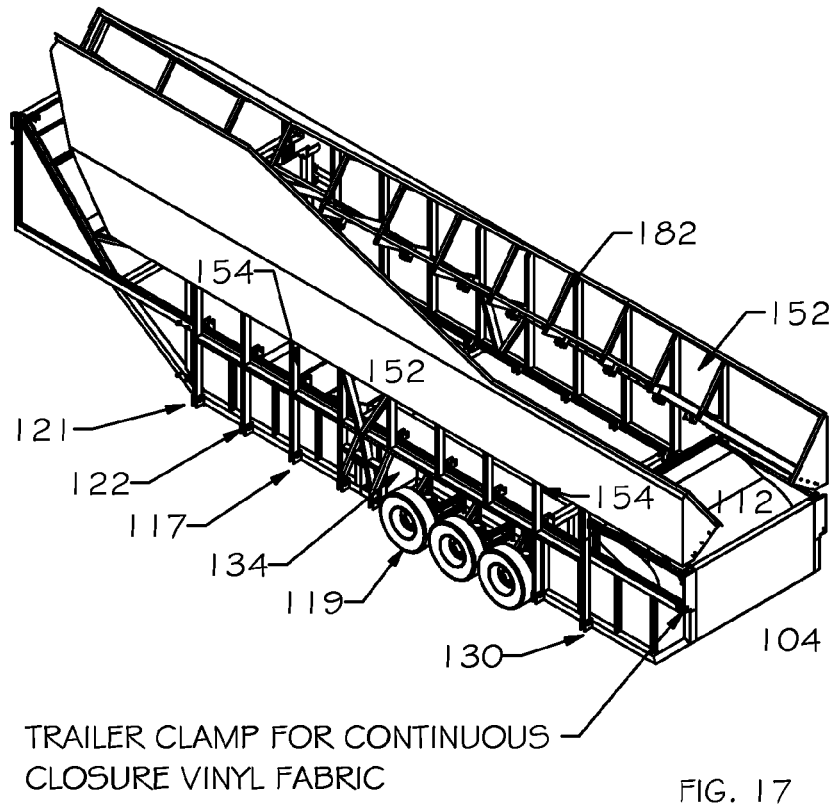
FIG. 17 is an isometric view of the sheet flow water ride attraction shown in FIG. 15 in its stowed position.
Figure 18:
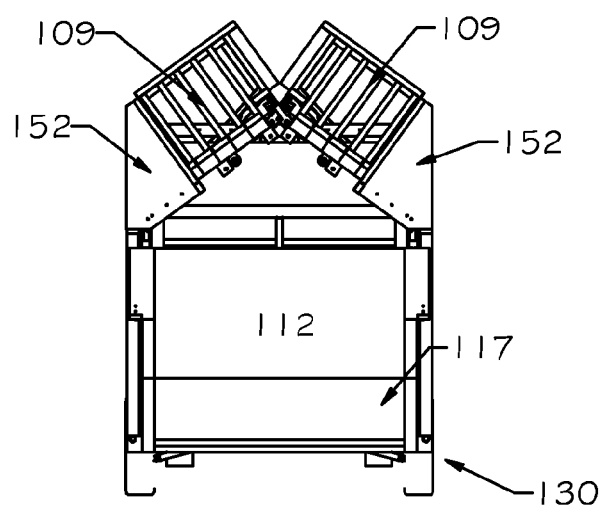
FIG. 18 is an end view of the sheet flow water ride attraction of FIG. 15 in its stowed position.
Figure 19:
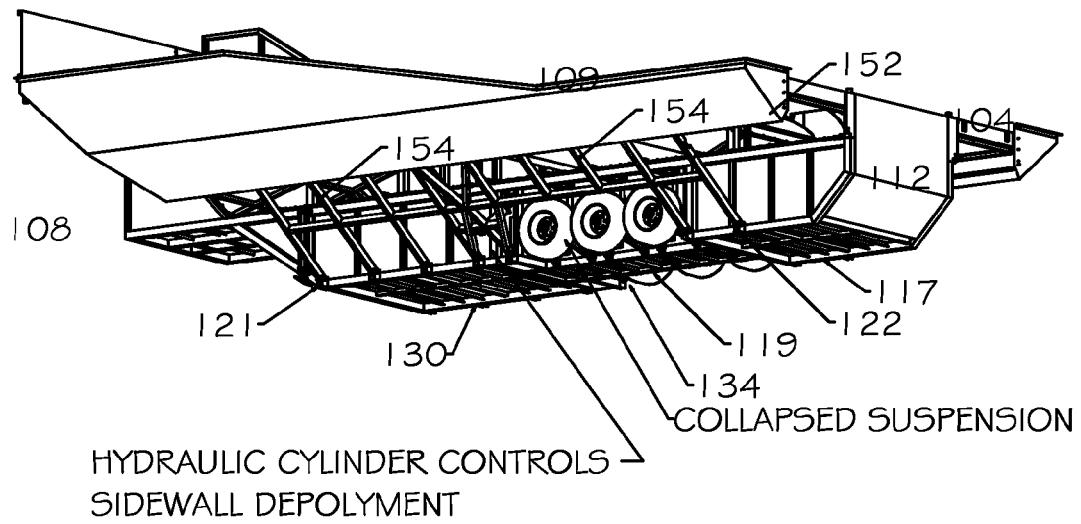
FIG. 19 is an isometric view of the second embodiment of the sheet flow water ride attraction of the present invention showing the arrangement of the integrated sections with the water ride in its fully deployed position.
Figure 20:
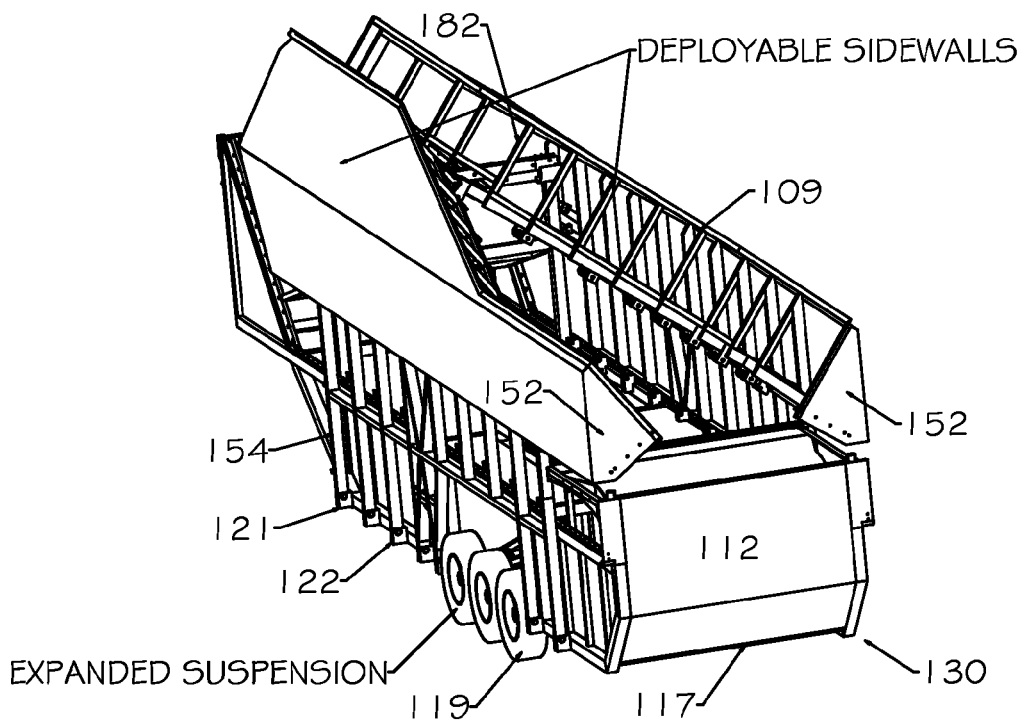
FIG. 20 is an isometric view of the second embodiment of the sheet flow water ride attraction of the present invention showing the arrangement of the integrated sections with the water ride in its stowed position.
Figure 23A:
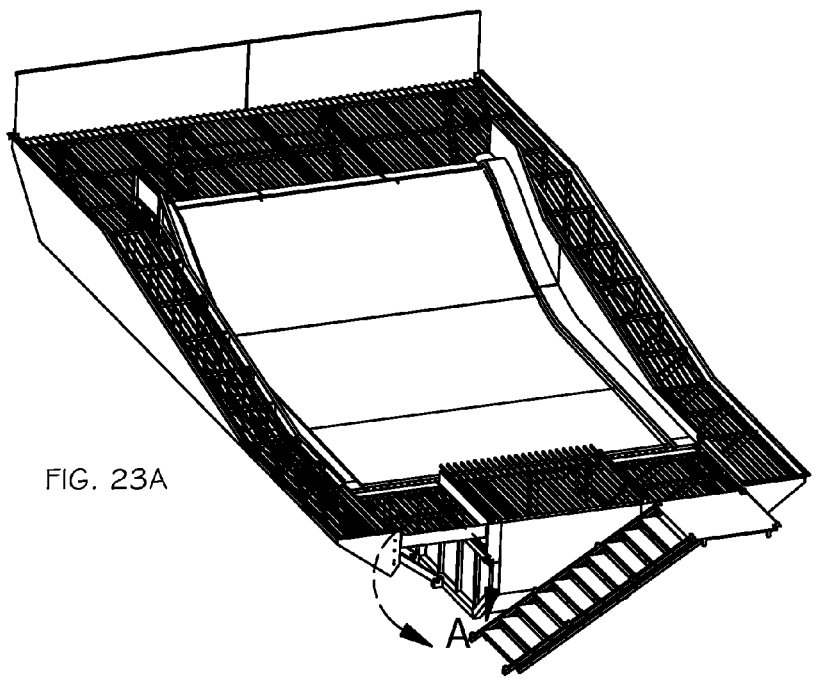
FIG. 23a is the same view shown in FIG. 11 except that the detail for FIG. 23b is shown.
Figure 23B:
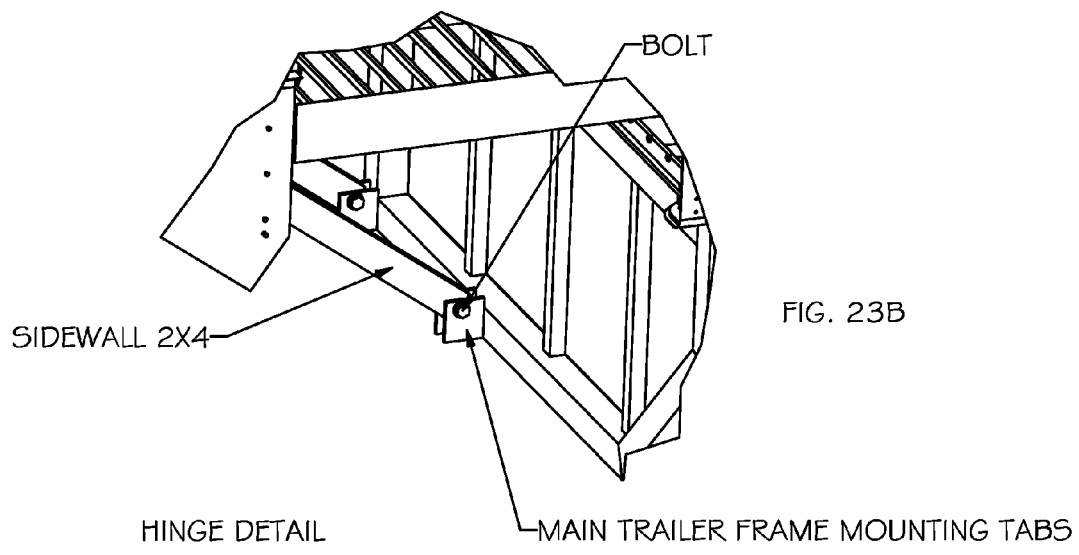

FIGS. 12, 15, 16, 17, 18, 19 and 20 show pivoting integrated support sections 152 extending longitudinally along the sides of basin 117. These sections 152 preferably extend from front end 104 to back end 108, wherein FIG. 17 shows sections 152 in their stowed position, and FIG. 19 shows them in their deployed position. Integrated sections 152 are preferably adapted to be pivoted and expanded outward to form a laterally extended framework, including sheaves 114, upon which fabric 116 can be stretched to form ride surface 105, and on top of which grates can be provided as shown in FIG. 11. Sections 152 preferably comprise laterally and vertically extended frame members 182 for supporting the grates, as can be seen in FIGS. 17, 20 and 24. Sections 152 also preferably comprise lower support members 154 that are extended from hinge 122 (along hinge line 121) and capable of being swung up and out to provide support for each integrated section 152. As shown in FIG. 23b, each support member 154 preferably has hinges 122 that allow each support member 154 and therefore each integrated section 152 to be swung down from a stowed position, as shown in FIG. 20, to a deployed position, as shown in FIGS. 19 and 23a, and vice verse.

Figure 13:
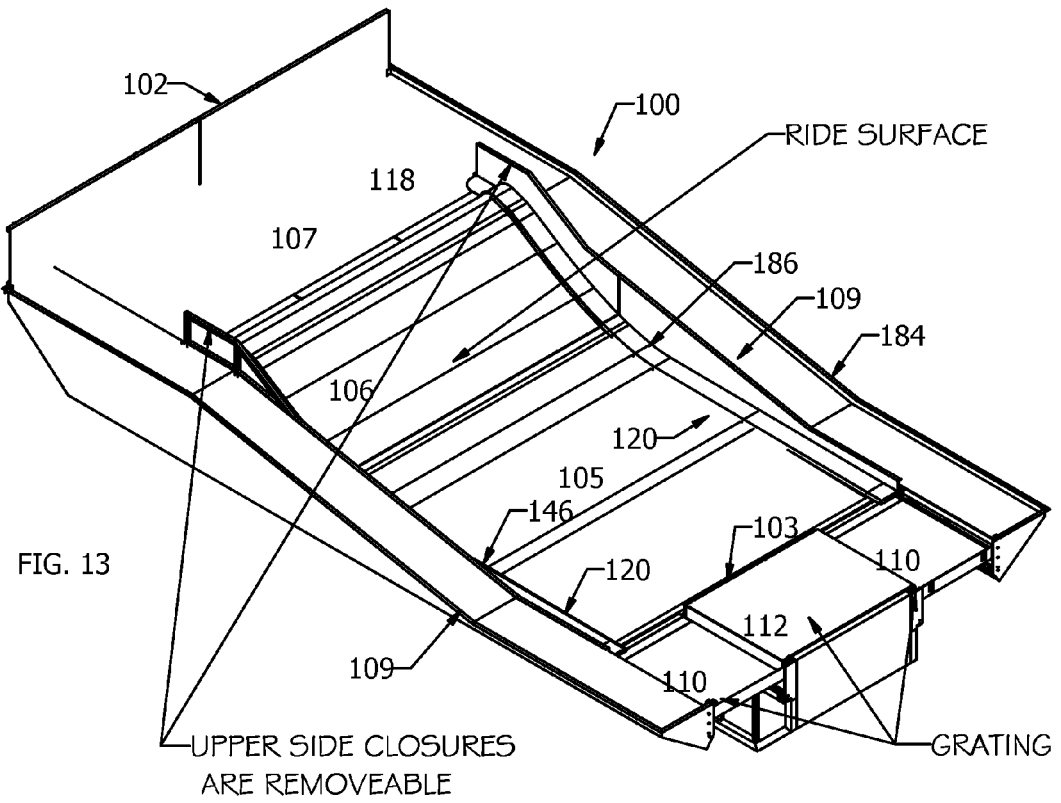
FIG. 13 is an isometric view of the sheet flow water ride attraction shown in FIG. 11 in its fully deployed position—shown without the grates.

Integrated sections 152 preferably comprise a framework for supporting the grating for walkways 109 as well as extension sections 110 and 132. Accordingly, once sections 152 are deployed, the framework for walkways 109 and extensions 110 and 132 are automatically deployed as well, wherein the grating can then be added to complete the set up. FIG. 20 shows integrated sections 152 with walkways 109 extended upward in their stowed positions about hinges 122, whereas, FIGS. 13 and 19 show integrated sections 152 with walkways 109 in their fully deployed laterally extended positions. When deployed, walkways 109 allow participants to walk easily from stairway 115 to entrance platform 107, and because they are extended on either side of ride surface 105, longitudinally along either side, they can also function as viewing areas and exit platforms on which participants can easily egress from ride surface 105. As in the previous embodiment, walkways 109 are preferably provided with grates and railings that are cantilevered out. In this embodiment, however, walkways 109 are preferably not detachable but are integrated with sections 152 and therefore easier to deploy.

Figure 21:
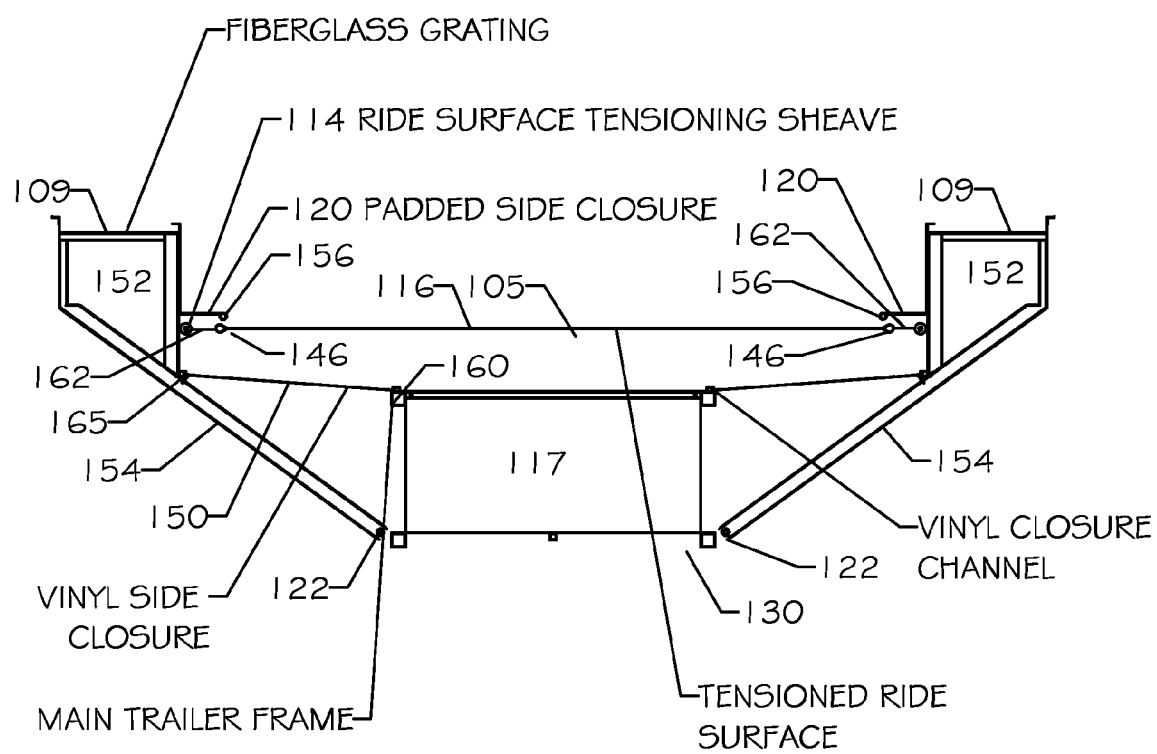
FIG. 21 is a section view of the second embodiment of the sheet flow water ride attraction of the present invention showing the arrangement of the ride surface and side closure fabric that are connected to the integrated sections of the water ride.
Figure 22A:
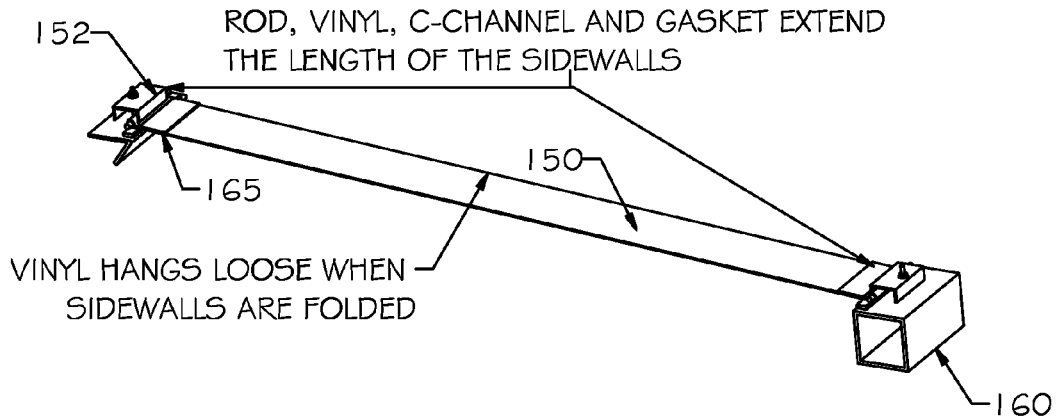
FIGS. 22a and 22b are section views of the second embodiment of the sheet flow water ride attraction of the present invention showing the arrangement of the vinyl side closure connected to the integrated section of the water ride.
Figure 22B:
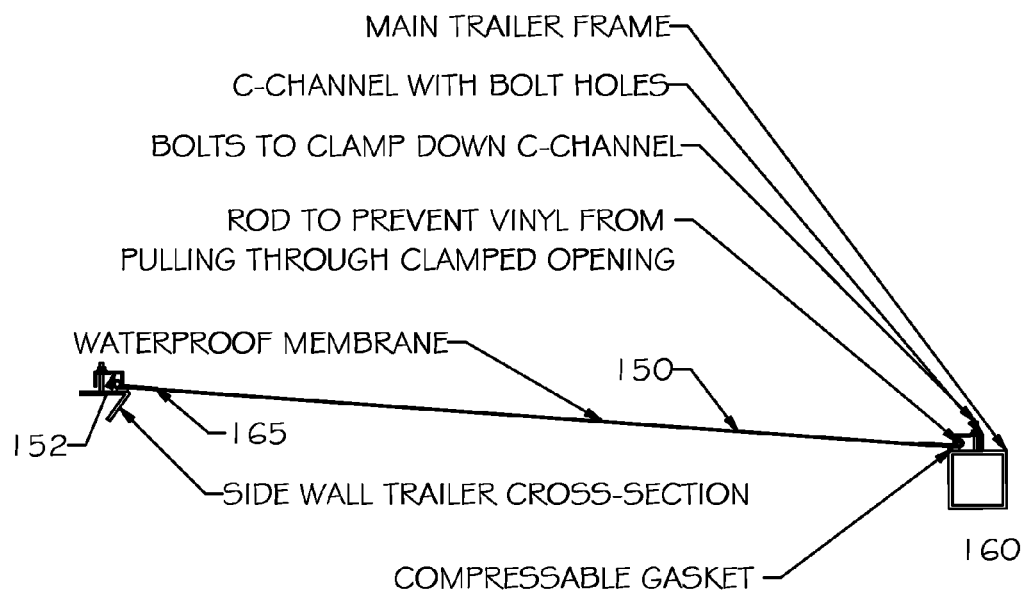

It can be seen that in this embodiment each support member 154 is extended out about the same length to support integrated sections 152 in their extended positions. When integrated sections 152 are fully extended and deployed, as shown in FIGS. 21 and 23a, support members 154 are preferably extended out at an angle to support integrated sections 152 in their deployed positions relative to basin 117. This helps to support walkways 109 extending above sections 152. Extensions 110 and 132 also help to hold sections 152 at the predetermined position. Nevertheless, each integrated section 152 preferably has an angled or inclined configuration that forms the slope or incline of walkway 109 as well as the incline or slope of ride surface 105.

Ride surface 105 preferably has an incline 106 that extends upward from nozzle end 104 to elevated entrance platform 107 on end 108. Ride surface 105 is preferably made of a single unitary stretched or tensioned fabric or membrane 116, as shown in FIG. 21, secured longitudinally along its edges 146 with ride surface tensioning sheaves 114 and cables 162 holding it in place. Fabric 116 is preferably stretched and suspended between tensioning sheaves 114 in this manner. The amount of tensioning provided by sheaves 114 can also determine how flexible or stiff ride surface 5 will be. A padded side closure 120 is preferably provided above edges 146 longitudinally along ride surface 105 for added protection, as shown in FIGS. 11, 11a and 21.

Fabric 116 of ride surface 105 is preferably connected to cables 162, which in turn are connected to tensioning sheaves 114, which in turn are connected to connectors 180, which in turn are connected to integrated sections 152, wherein ride surface 105 can be sloped and stretched tightly between them. By connecting fabric 116 to sections 152 using a plurality of connectors 180, which are extended along an incline or slope as shown in FIG. 24, ride surface 105 can also be provided with a similar incline or slope. The degree to which tensioned fabric 116 is stretched and pulled tight depends on the loads that are expected to be applied on ride surface 105 and how much flexibility and tension is desired. In the preferred embodiment, fabric 116 is preferably made adjustable by virtue of being able to adjust tensioning sheave 114, and in some cases, it may also be desirable for fabric 116 to be made detachable so that it can be removed and stored separately from trailer 130. That way, the material will not be damaged along the way. But in the preferred embodiment, fabric 116 is preferably maintained on sheaves 114 and is capable of being folded up as a unitary piece when sections 152 are stowed, which makes setting up and taking down easier.

As shown in FIG. 21, on the inside of each integrated section 152 there is preferably a waterproof vinyl fabric or membrane 150 extended between connection point 165 of sections 152 and basin 117 to facilitate the flow of water from ride surface 105 into basin 117. That is, water that may flow off of ride surface 105 will be able to flow down onto membrane 150 and into basin 117. In this respect, gaps 156 are preferably provided between padded side closures 120 and ride surface 105, and between ride surface 105 and tensioning sheave 114, which allows water to flow down the sides of ride surface 105 and into basin 117.

Membrane 150 preferably remains attached when water ride 100 is stowed, wherein membrane 150 can be collapsed into a folded position. When sections 152 are deployed, membrane 150 is preferably pulled tight between points 165 on sections 152 and main trailer frame 160 on basin 117. Membrane 150 is preferably unitary in construction to avoid leaks and can be attached using connections that can be made in any conventional manner, such as with a C-channel, bolts, clamps, and a rod to prevent the membrane from pulling through the clamped opening.

FIGS. 15 to 18 and 20 show water ride 100 in its stowed position. When integrated sections 152 are stowed, some of the grated sections, such as grates on extension 110 on front end 104 and grates on extension 132 on back end 108 are preferably swung up or otherwise removed before sections 152 can be raised and swung up. By making these adjustments, as can be seen in FIGS. 17, 18 and 20, the entire water ride 100 is preferably made compact and suitable for storage in a standard shipping container. Wheels 119 are preferably extended to permit trailer 130 to be rolled and pulled such as with a hitch, but can be raised if necessary to fit into a shipping container.

To deploy and set up water ride 100, one can simply unfold and swing down integrated sections 152, and in such case, because walkways 109 are integrated with sections 152, the walkways are automatically deployed as well. Sections 152 are preferably lowered, as shown in FIG. 24, from their stowed position, to their deployed position, which is substantially extended out laterally. FIG. 24 shows sections 152 being lowered about halfway as members 154 are being pivoted and lowered during deployment. Members 154, in such case, can be pivoted down about their hinges 122, until sections 152 are deployed and substantially laterally extended, as shown in FIG. 19. Sections 152 can be maintained in their predetermined positions by conventional means.

By maintaining ride surface 105 (comprising tensioned fabric 116), as well as membrane 150, on sections 152, those features will automatically be deployed when sections 152 are deployed. On the other hand, after deploying sections 152, it will still be necessary to install grating on housing 112, extensions 110, walkways 109, extensions 132 and entrance platform 107, such that water ride 100 will look more like FIG. 11 (rather than FIG. 13). Railings can be installed on posts 184 located on integrated sections 152 and railings or wall 102 can also be installed. Side walls 186 can be secured into position above ride surface 105 and against vertical framework members 182. Side walls 186 are preferably padded and help to provide a barrier along the sides of ride surface 105.

When it is time to take water ride 100 down, the same steps can essentially be taken but in a reverse order, i.e., the side walls 186, railings, and gratings from walkway 109, extensions 110 and 132, housing 112 and entrance platform 107, will have to be removed first. Sections 152 are then preferably raised, as shown in FIG. 24, from their deployed positions, to their stowed positions, which is substantially vertical. FIG. 24 shows sections 152 being raised (or lowered) about halfway as members 154 are being pivoted and raised during stowing (or deploying). Members 154, in such case, can be pivoted up about their hinges 122, until sections 152 are stowed and substantially vertical, and form a compact configuration, as shown in FIG. 20.

Most of the structural components of the present invention including without limitation basin 117, integrated sections 152, members 154 and 182, housing 112, entrance platform 107, walkways 109, railings 115, grated sections 118 and extensions 110 and 132, can be made with stainless steel or other durable and strong corrosion resistant material. Fabric 116 can be made using a suitable durable fabric or membrane material such as a reinforced polyester membrane coated on at least one side with a fluorinated polymer material such as rubber, polyurethane, latex, Teflon, fluorinated polymers, and/or PVDF. The fabric can comprise of fibers or yarns such as carbon fiber, Kevlar®, rayon, nylon, polyester, PVC, and/or PVDF. The other areas of the water ride surrounding ride surface 105 are preferably covered with a waterproof padding consisting of foam with a water-impervious later or coating on top.

What is claimed is:

1. A portable water ride comprising:
a trailer having a water catch basin for storing water;
two supports pivotally connected along the longitudinal sides of said trailer wherein said supports are capable of being pivoted between a lower deployed position and an upper stowed position;
a flexible membrane connected to said supports and substantially tensioned between them to form a flexible ride surface;
at least one nozzle located at a first end of said trailer for injecting a sheet flow of water onto said flexible ride surface;
a platform at a second end of said trailer opposite said first end located next to said flexible ride surface; and
wherein said supports comprise a series of pivoting bars having lower and upper segments, wherein when said bars are in their deployed position, said upper segments are extended substantially vertically, and when said bars are in their stowed position, said lower segments are extended substantially vertically.

2. The water ride of claim 1, wherein a connector is provided on each of said bars, wherein with said bars in their deployed position, said connectors form a series of points along a slope such that when said ride surface is connected to said connectors, the slope of said ride surface is determined substantially by said slope of said connectors.

3. The water ride of claim 1, wherein said supports comprise two longitudinally extended integrated support sections provided on either side of said trailer, wherein said integrated sections comprise a framework for supporting said ride surface thereon and enabling various gratings and/or walkways to be provided thereon.

4. The water ride of claim 3, wherein said framework comprises connectors for supporting said ride surface along an incline and at least one sheave on either side thereof with at least one cable for holding said flexible ride surface and keeping it tensioned between said sheaves.

5. The water ride of claim 4, wherein said ride surface has a padded closure on either side thereof, along with sidewalls for providing a barrier between said ride surface and said framework.

6. The water ride of claim 1, wherein on either side of said nozzle there is a first grated extension, and on either side of said platform there is a second grated extension, and wherein a walkway is provided on either of said ride surface between said first and second extensions.

7. The water ride of claim 1, wherein a walkway is extended on either side of said trailer and extended outward to provide egress means for participants on said ride surface and a walking surface extending from said first end to said second end.

8. The water ride of claim 1, wherein said flexible ride surface comprises a first membrane capable of being tensioned between said supports, wherein said first membrane is extended along an incline from below said nozzle and upward toward said platform.

9. The water ride of claim 8, wherein a second membrane is provided that extends below said first membrane and between said supports and said basin, wherein said second membrane helps to drain water from said ride surface down into said basin.

10. A method of stowing and deploying a portable water ride comprising:
providing a trailer having a water catch basin for storing water;
pivotally connecting a longitudinally extended support member on each longitudinal side of said trailer wherein said support members are capable of being pivoted between a lower deployed position and an upper stowed position;
providing at least one connector on each of said support members;
providing a flexible ride surface capable of being connected to said connectors and tensioned between said support members;
providing a nozzle at a first end of said trailer;
providing a platform at a second end of said trailer opposite said first end; and
wherein the method comprises the additional step of providing support members comprising a series of bars having lower and upper segments, wherein when said bars are in their deployed position, said upper segments are extended substantially vertically, and when said bars are in their stowed position, said lower segments are extended substantially vertically.

11. The method of claim 10, wherein the method comprises the additional step of providing a connector on each of said bars, wherein with said bars in their deployed position, said connectors form a series of points along a slope such that when said ride surface is connected to said connectors, the slope of said ride surface is determined substantially by said slope of said connectors.

12. The method of claim 10, wherein the method comprises the additional step of providing two longitudinally extended integrated sections on either side of said trailer, wherein said integrated sections comprise a framework for supporting said ride surface thereon and enabling various gratings and/or walkways to be supported thereon.

13. The method of claim 12, wherein the method comprises the additional step of providing connectors for supporting said ride surface along an incline and providing at least one sheave on either side thereof with at least one cable for holding said flexible ride surface and keeping it tensioned between said sheaves.

14. The method of claim 13, wherein the method comprises the additional step of providing a padded closure on either side of said ride surface, along with sidewalls for providing a barrier between said ride surface and said framework.

15. The method of claim 10, wherein the method comprises the additional step of providing on either side of said nozzle housing a first grated extension, and on either side of said platform a second grated extension, and providing a walkway on either of said ride surface between said first and second extensions.

16. The method of claim 10, wherein the method comprises the additional step of providing a walkway extended on either side of said trailer and extended outward to provide egress means for participants on said ride surface and a walking surface with railings extending upward from said first end to said second end.

17. The method of claim 10, wherein the method comprises the additional step of making said flexible ride surface with a first membrane capable of being tensioned between said support members, wherein said membrane is extended along an incline from said nozzle housing and upward toward said platform.

18. The method of claim 17, wherein the method comprises the additional step of providing a second membrane that extends below said first membrane and between said support members and said basin, wherein said second membrane helps to drain water from said ride surface down into said basin.

19. A portable water ride comprising:
a trailer having a water catch basin for storing water;
two support members pivotally connected along the longitudinal sides of said trailer wherein said support members are capable of being pivoted between a lower deployed position and an upper stowed position, wherein each of said support members has a series of connectors that extend along a predetermined slope;
a flexible membrane connected to said connectors such that with said support members in said lower deployed position, said membrane is substantially tensioned between said support members to form a flexible ride surface, and wherein the slope of said ride surface is determined substantially by said slope formed by said connectors; and
at least one nozzle located at a first end of said trailer for injecting a sheet flow of water onto said flexible ride surface.

20. A method of stowing and deploying a portable water ride comprising:
providing a trailer having a water catch basin for storing water having a longitudinally extended support member pivotally mounted on each side of said trailer, wherein said support members are capable of being pivoted between a lower deployed position and an upper stowed position;
connecting a flexible ride surface onto and between said support members, wherein said flexible ride surface is capable of being tensioned between said support members when said support members are in their lower deployed position, and of being stored between said support members when said support members are in their upper stowed position;
providing a nozzle at a first end of said trailer; and
wherein the method comprises the additional step of pivoting said support members to their lower deployed position and injecting a sheet flow of water onto said ride surface through said nozzle, and then, pivoting said support members to their upper stowed position and storing said flexible ride surface between said support members.

* * * * *